(12) United States Patent
Nelson

(10) Patent No.: US 7,288,705 B1
(45) Date of Patent: Oct. 30, 2007

(54) METHOD FOR TEACHING MUSICAL NOTATION AND COMPOSITION

(76) Inventor: Beverly Hale Nelson, P. O. Box 6005, Bellingham, WA (US) 98227

( * ) Notice: Subject to any disclaimer, the term of this patent is extended or adjusted under 35 U.S.C. 154(b) by 164 days.

(21) Appl. No.: 11/150,515

(22) Filed: Jun. 9, 2005

Related U.S. Application Data

(60) Provisional application No. 60/649,925, filed on Feb. 3, 2005, provisional application No. 60/578,746, filed on Jun. 9, 2004.

(51) Int. Cl.
*G10F 1/18* (2006.01)
(52) U.S. Cl. .......................................... 84/10; 434/178
(58) Field of Classification Search ................ 84/10, 84/483.2, 484, 464 A, 470 R, 471 R, 611, 84/612; 434/178
See application file for complete search history.

(56) References Cited

U.S. PATENT DOCUMENTS

2003/0207239 A1* 11/2003 Langlois ..................... 434/178
2005/0241459 A1* 11/2005 Risley ....................... 84/464 A

* cited by examiner

*Primary Examiner*—Lincoln Donovan
*Assistant Examiner*—Jianchun Qin
(74) *Attorney, Agent, or Firm*—Todd N. Hathaway

(57) ABSTRACT

A method for teaching musical notation from rhythm. A musical rhythm is demonstrated to the pupils, and is associated with a worksheet having a plurality of blanks, the blanks each representing a beat of the rhythm and being grouped in accordance with the rhythm. The blanks are then filled with symbols representing beats and pauses in the rhythm. The rhythm is demonstrated by having or otherwise indicating a series of objects, such as blocks. The symbols are filled in with colors representing individual notes in accordance with a predetermined code. At more advance stages, the worksheets can be used to compose simple songs. The worksheets can be printed paper, or may be an electronic display such as on a computer screen. Words and mathematical problems can be incorporated into the worksheets and exercises to complement the pupil's instruction in other areas.

21 Claims, 6 Drawing Sheets

Chart: Music Algebraic Equations for the top measures showing "Blocked Notation Through Rhythm"

METHOD FOR TEACHING MUSICAL NOTATION AND COMPOSITION

RELATED APPLICATIONS

This application claims the benefit of U.S. Provisional Patent Application Nos. 60/578,746 filed on 9 Jun. 2004 and 60/649,925 filed on 3 Feb. 2005.

BACKGROUND a. Field of the Invention

The invention relates generally to methods for teaching music and, more particularly, to a method for teaching musical notation that establishes an association between rhythm and physical objects or visual indicia and may also be used in conjunction with algebraic equations and other mathematical instruction.

b. Related Art

The importance and beneficial effects of developing musical skills is well recognized by those who study childhood development. For example, it is believed that what is generally referred to as human intelligence is actually made up of a plurality of distinct but interrelated "intelligences," each of which appears to be somewhat localized in separate regions of the brain; some specialists have theorized that there are at least seven identifiable "intelligences" namely (1) use of the body to solve problems or to make things, (2) an understanding of other individuals, (3) an understanding of ourselves, (4) language, (5) logical-mathematical analysis, (6) special representation, and (7) musical thinking (e.g., see *Frames of Mind, The Theory of Multiple Intelligences*, Howard Gardner, Basic Books, Inc. (1983)).

Of all the identifiable "intelligences," musical thinking is believed to be one of the first to become enabled during a child's development. As a result, to the extent that this particular intelligence is successfully developed as early as possible, the symbolization and other skills which the child thus acquires enable the other intelligences to be developed at an accelerated rate. In a broader context, musical intelligence is one of the intelligences or abilities which is considered to make up what is commonly referred to as "right brain" thought; it has become increasingly recognized that development of both "right brain" and "left brain" skills is critical if individuals are to fully achieve their potential.

Despite recognition of its importance, conventional academic environments place relatively little emphasis on musical thinking, with the result that this particular intelligence (together with much or most "right brain" thinking) tends to be widely undeveloped in modern Western society. Not only have most academic programs traditionally stressed "left brain" thinking, but this tendency has in some respects become even more pronounced in recent years. The reasons for this are manifold, but central to the problem appears to be a combination of increasingly demanding academic requirements and the assumption that musical instruction comes at the expense of instruction in areas of "left brain" skills, to which higher priority is given. In other words, musical instruction, despite its acknowledged benefits, is considered a relative luxury and therefore loses out to other areas of instruction in an increasingly demanding academic schedule. Although on the surface this appears to be merely a matter of priorities, the de-emphasis of musical instruction in fact leads to stymied development overall, including impaired development of those "left brain" intelligences on which the instruction focused.

A contributing factor in this situation is the nature of traditional methods used to teach music. Although employed for many generations, traditional techniques incorporate several inherent flaws that impair their effective utilization in the context of both childhood development and contemporary academic settings. To begin with, most techniques use a conventional musical score as a starting point, which presupposes—rather than develops—a level of abstract thinking on the part of the pupil; as a result, conventional musical instruction does not commence until the child is older than optimal and has reached a higher academic level, so that much of the potential developmental benefit of musical instruction is lost. Moreover, conventional methods and curriculum for teaching music do not allow the instruction to integrate with other curricula, so that musical instruction is viewed as a "stand alone" program which absorbs resources at the expense of other areas of instruction.

Accordingly, there exists a need for a method and system for teaching music that can be implemented at earlier stages of childhood development than present methods, so as to take full advantage of the developmental benefits of musical training, but which is not limited to use with young children and can be used with older pupils as well. Furthermore, there exists a need for such a method and system that can be integrated with other curricula so as to allow musical instruction to be implemented in an academic environment with minimal expense to the resources committed to other areas of instruction. Still further, there exists a need for such a method and system that is enjoyable to the pupils and that can be implemented in a classroom or other academic environment utilizing inexpensive and readily available materials.

SUMMARY OF THE INVENTION

The present invention has solved the problems noted above, and provides a method for instructing musical notation to young pupils. The method comprises the steps of (a) demonstrating that a musical rhythm having a plurality of beats; (b) associating the rhythm with a worksheet having a plurality of blanks thereon, each blank representing a beat of the rhythm and the blanks being grouped in accordance with the rhythm; and (c) filling the blanks on the worksheet with first and second symbols, the first symbol representing a beat which is sounded in the rhythm and the second symbol representing a beat which is a pause in the rhythm. The blanks on the worksheet may be grouped in accordance with the meter of the rhythm.

The step of demonstrating the rhythm may comprise indicating a plurality of objects in sequence with the rhythm. The step of indicating a plurality of objects may comprise tapping a plurality of objects that are grouped in accordance with the meter of the rhythm. The method may further comprise the step of arranging substantially interchangeable objects in rows in accordance with the meter of the rhythm. The interchangeable objects may comprise a plurality of blocks for being tapped with a mallet. The blanks on the worksheet may comprise blank squares that correspond in shape to the blocks that are tapped.

The method may further comprise the step of associating each of the symbols on the worksheet with a color that represents an individual note of a musical scale in accordance with a predetermined code. The step of filling the blanks on the worksheet may comprise forming the first symbol that indicates a sounded beat with a blank open area that can be colored in by a pupil. The first symbol may be a circle and the second symbol may be a dash.

The method may further comprise the step of practicing the rhythm that has been demonstrated to the pupils. The step of practicing the rhythm may comprise presenting at least one practice chart having the first and second symbols printed thereon. The step of practicing the rhythm may further comprise the step of presenting words with the printed symbols on the at least one practice charts so as to provide simple songs for practicing rhythm.

The method may further comprise the step of providing colored markers on the keys of a keyboard in accordance with the predetermined code. The method may further comprise the step of playing the keyboard from the worksheets having the colored in symbols thereon. The method may further comprise the step of allowing the pupils to mark and color in the worksheets so as to create musical compositions thereon, and to play the keyboard from the compositions created on the worksheets. The step of providing the colored markers on the keyboard may comprise detachably mounting the markers to the keys of the keyboard so that the markers can be removed when no longer needed by the pupil.

The method may further comprise the step of presenting a musical stave having colored markers arranged so as to indicate the positions on the stave of the notes that are represented by the colors of the markers. The method may further comprise the step of allowing the pupil to detachably mount the colored markers to the printed stave. The method may further comprise permitting the student to detachably mount a clef symbol to the stave.

The method may further comprise the step of relating a mathematical problem to at least one sequence of the blanks on a worksheet, so as to integrate mathematical instruction into the method for instructing musical notation. The step of relating a mathematical problem to at least one sequence of blanks may comprise providing musical note time values for selected blanks of the at least one sequence and leaving time values for other blanks open to be determined in completing the mathematical problem. The step of relating a mathematical problem to the sequence of blanks may comprise relating a plurality of fractional values to the sequence, or may comprise relating an algebraic equation to the sequence.

The method may further comprise the step of associating a plurality of words with the blanks on the worksheet so as to form a song to be sung when the blanks are filled with symbols representing musical notes, the words being selected from subject matter in at least one other area of instruction, so as to integrate the other area of instruction into the method for instructing musical notation.

These and other features and advantages of the present invention will be more fully understood from a reading of the following detailed description with reference to the accompanying drawings.

DETAILED DESCRIPTION

FIGS. 1-7B illustrate the steps and materials employed for musical instruction in accordance with a preferred embodiment of the present invention. The method employs experiential learning, a highly successful approach to education that is suitable for use from preschool levels through elementary school or longer.

The instruction is conducted in steps or phases, progressing from introduction to rhythm in its most basic form to musical concepts of increasing complexity and sophistication. In a preferred embodiment, these steps include, among others, the use of: tapping sequences, blocked sheets corresponding to the tapping sequences, printed exercise sheets similar to the blocked sheets, lined sheets for marking by the students, and public domain scores that are used for practice and/or modified to develop composition skills. As will be understood from the following description, however, not all of the steps or materials may be used in every application or embodiment of the invention; in particular, certain of the steps described below (e.g., the use of blocks to establish rhythm) may be skipped or modified when working with older pupils who have a certain preexisting grasp of rhythm.

A key to the success of the present invention is the link that is established between notation and the basic concept of rhythm. The beats of a rhythm are associated with suitable symbols, on a worksheet or other visual display, and the symbols are subsequently associated with the notes of a musical scale. Ultimately, a transition is made to a conventional black-and-white score.

Figure 1:
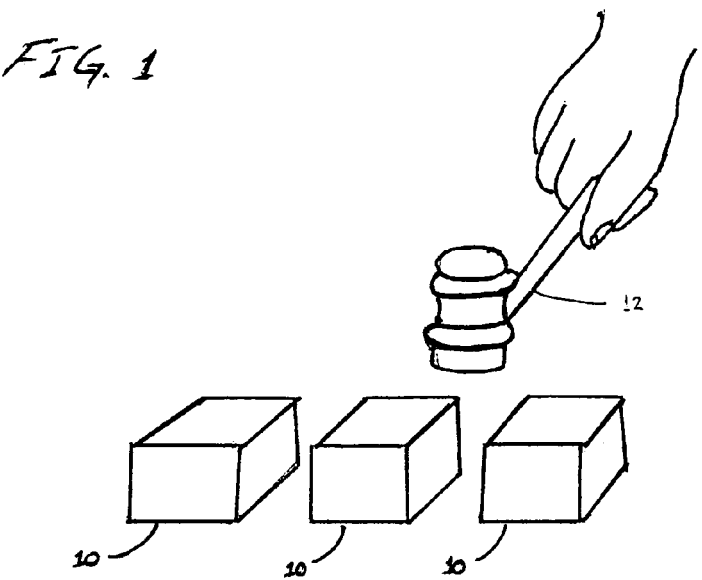
FIG. 1 is a perspective view of square wooden blocks arranged in a row of three, showing the manner in which these are struck with a mallet so as to demonstrate a three/four rhythm to the pupils.

In the embodiment which is illustrated, provision is made for associating rhythm with symbology through the medium of objects that can be touched, tapped, struck or otherwise designated in a physical manner, so that the association is more readily made for very young children. In the example that is shown in FIG. 1, the medium is provided by a plurality of blocks 10, each of which is substantially interchangeable with the others. The blocks are arranged in rows of three for three/four time, four for four/four time, two for two/four time, and so on, (according to the meter or measure (sometimes referred to as the "time signature". The blocks are then tapped by the teacher using a mallet 12, or other suitable instrument, progressing from left to right with an equal beat. The teacher may simultaneously verbalize, either with words or tones, as each of the blocks is struck or indicated.

After the teacher has modeled the technique, the tapping or other indicating procedure can be repeated by members of the class, either taking turns or on a group basis. At appropriate intervals, the blocks can be rearranged in other rows for four/four time, two/four time, and so on. It will be understood that other objects that can be arranged in rows may be used in place of the blocks, and that the objects may be indicated in other suitable ways (e.g., touched directly with the hand) rather than being struck with an instrument.

The purpose of this phase of instruction is to establish an association between each of the objects and the beat of the rhythm, e.g., between each of the blocks 10 in FIG. 1 and one beat of a three/four rhythm. Coincident developmental benefits, which compliment other areas of instruction, include the development of coordination, both in arranging and tapping the articles, and reinforcement of left-to-right progression. Furthermore, the exercise of arranging the blocks in rows of substantially identical units and identifying each of the articles as a subcomponent of the row yields benefits in terms of patterning, symbolization and understanding of math/fractions.

After the initial concept of rhythm has been established by tapping all of the blocks in sequence, a teacher next introduces the concept of pauses or rests. This is done by indicating the block or other article at its proper turn in the sequence, but without tapping it and/or verbalizing. This establishes a distinction between notes and rests, which is a fundamental aspect of music theory.

The foregoing steps are performed, with the pupils following the example modeled by the teacher, until the teacher is satisfied that a basic understanding of rhythm has been established in the minds of the pupils. As noted above, some older pupils may already have a basic grasp of rhythm, in which case one or more of the above steps may be skipped.

Figure 2:
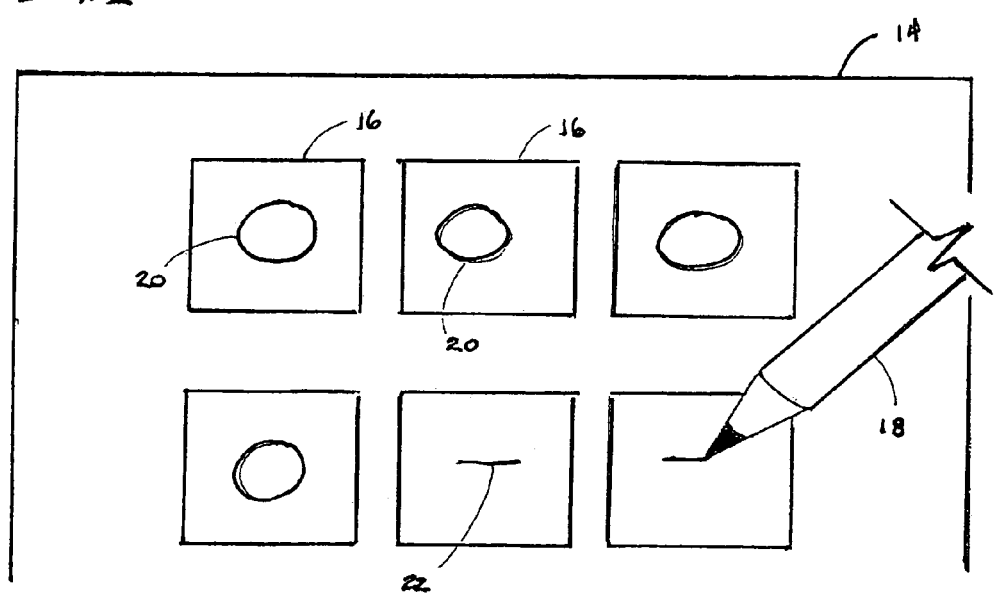
FIG. 2 is a plan view of a rhythm work sheet having two-dimensional square blanks arranged in rows of three, showing the manner in which these are filled with symbols using a pencil or other instrument so as to graphically illustrate a three/four rhythm.

As can be seen in FIG. 2, the pupils are next introduced to a rhythm worksheet 14 having a plurality of blank areas 16 arranged thereon in the same pattern as the blocks or other articles, i.e., in rows of three, rows of four, and so on. As used herein, the term "worksheet" includes both a physical sheet, such as a sheet of paper, and a corresponding image formed on a computer monitor or other display. Preferably, the blank areas correspond in shape to the objects that were tapped or struck in the preceding phases, e.g., the square blanks 16 that are shown in FIG. 2 correspond in shape to the square blocks 10 in FIG. 1, so that the association between the physical article and the two-dimensional symbol is more readily apparent to the child and therefore more quickly established. Moreover, the teacher may tap the squares on the sheet in order to reinforce the association with the blocks.

Figure 3A:
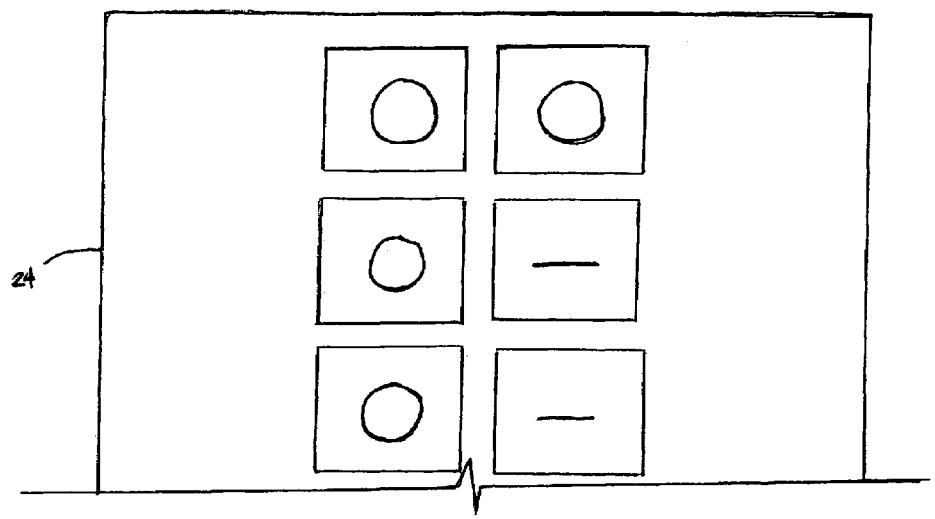
FIGS. 3A and 3B are plan views of rhythm worksheets, similar to FIG. 2, showing, respectively, worksheets for illustrating a two/four rhythm and a four/four rhythm.
Figure 3B:
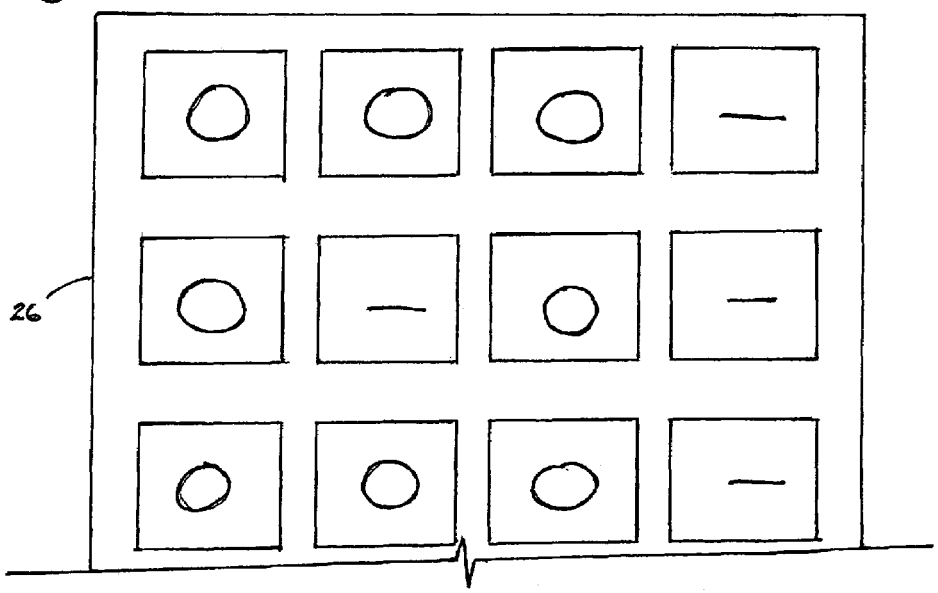

Again following instruction/modeling by the teacher, the students use a pencil 18 or other suitable writing instrument to mark the squares 16 with predetermined symbols that represent the beats and rests of the rhythm. In the illustrated embodiment, beats are represented by circles 20 and rests are represented by dashes 22. The circles and dashes have the advantages of being easily drawn and distinguished by young children, although it will be understood that other suitable symbols may be employed; in general, however, it is preferable that the symbol which indicates a note (as opposed to a rest) be one that defines an enclosed, blank area that can be colored by the child in subsequent steps, as will be described in greater detail below. As can be seen in FIGS. 3A-3B, additional worksheets 24, 26 are provided for two/four time, four/four time, and so on.

Accordingly, as the teacher taps each block, the child draws a circle (or other predetermined symbol) in the corresponding square on the worksheet. For those blocks that are not tapped, the child draws a line (or other predetermined symbol) representing a rest. Therefore, in the example shown in FIG. 2, the child has drawn symbols indicating, in three/four time, "beat-beat-beat, beat-pause-pause". The teacher proceeds slowly at first, but even very young children are soon able to mark the "o"s and "-"s quite quickly. The result is a rapid transition to symbolization. Coincident developmental benefits are provided in drawing and writing skills.

As a next step, the children may tap (or otherwise indicate) the blocks or other articles following the marks that they have made on the worksheets, tapping a block for each circle and skipping a block for each dash. This serves to further establish the association between the symbols and the notes/pauses of the rhythm, as well as to serve as preparation for playing an actual musical instrument from a score.

Figure 4:
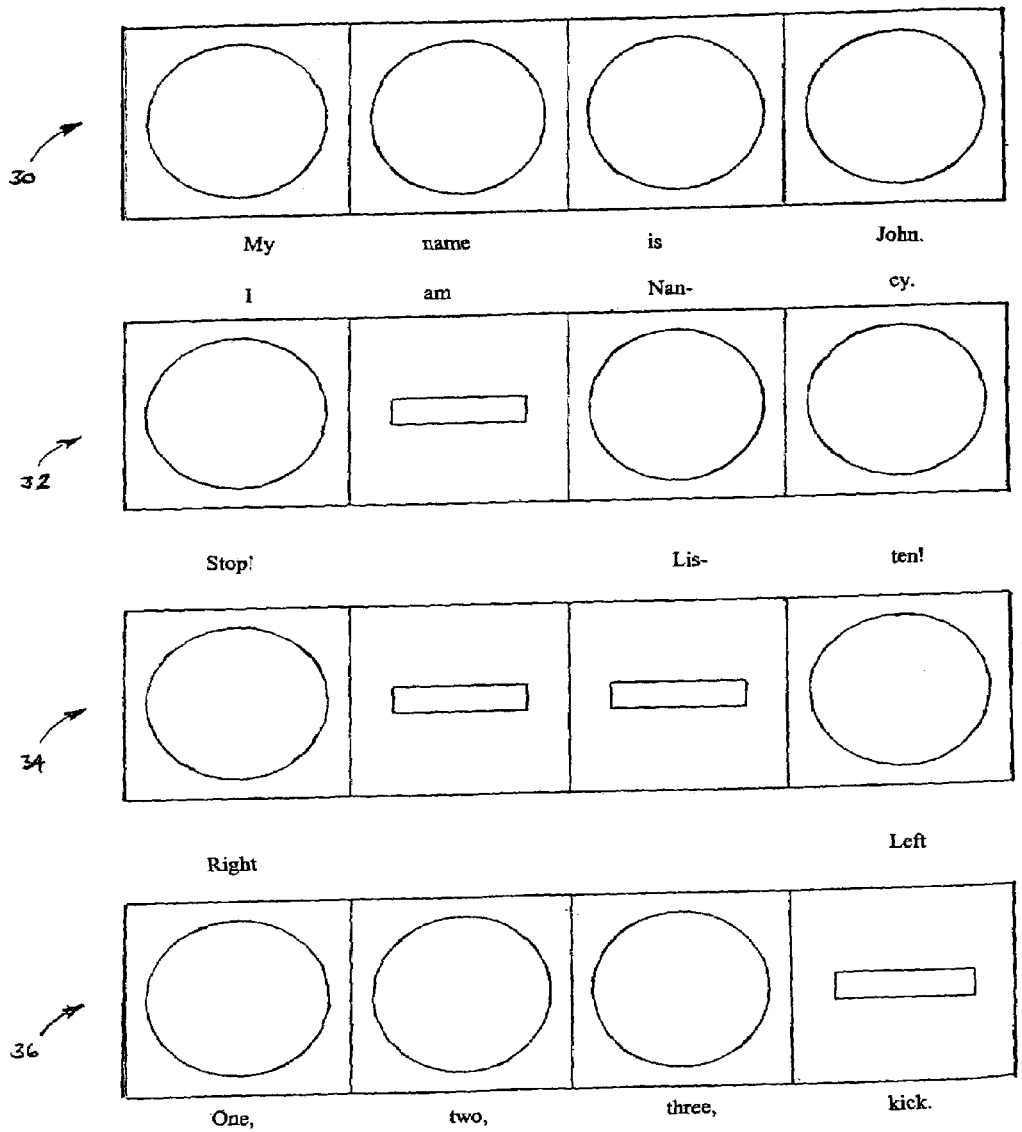
FIG. 4 is an elevational view of a rhythm exercise chart, similar to the worksheet shown in FIG. 3B, on which the circles and dashes denoting notes and rests are preprinted, and to which words can be applied, which is used to further practice and develop the pupil's understanding of rhythm.

Structured practice can be continued using rhythm exercise charts or sheets having squares that are preprinted with circles and dashes, as shown in FIG. 4. The exercise charts are preferably sufficiently large that they can be posted by the teacher and viewed by the entire class simultaneously, with the teacher keeping the beat by pointing at each block in sequence with the rhythm.

The exercise charts are suitably provided in sets for the various meters (3/4 time, 4/4 time, etc.), and include or may be marked with words such as those shown in the figures. An element of physical activity is also preferably included, which further develops an understanding of and feel for the rhythms as well as helping to develop physical coordination. For example, the rhythm exercise chart shown in FIG. 4 includes a first sequence 30 "My name is John" and a second sequence 32 "Stop!-Listen!". When practicing with the first sequence, the students would, for example, step rhythmically one-two-three-four in a circle or perhaps around the room, chanting "My-name-is-John" and feeling the beat of the rhythm. The second sequence "Stop!-Listen!" introduces a rest and demands a degree of concentration and coordination that provides the students with a moderate degree of challenge.

The "Right-Left" sequence 34 is still more challenging and requires considerable thinking and coordination as the students move or shift with the rhythm. The "One, Two, Three, Kick" sequence 36 is a Latin rhythm that adds an element of fin, to which the students can kick, turn, jump, hop or even form a conga line. Other examples of movements matched to the time and feel of the rhythm include stepping, marching and twirling.

For somewhat older students, the rhythm exercise charts may incorporate more sophisticated words or information in the songs as appropriate to their level of development and/or their studies in other areas; for example, if the students happen to be studying a particular country in Geography class, the name of the country and some of its cities and characteristics (e.g., foods, weather, etc.), as well as examples of its language, can easily be incorporated in a series of simple rhythm sequences similar to those which are shown.

Pie charts illustrating the time signatures may be used in conjunction with the pre-printed rhythm exercise charts to further clarify and reinforce the math concepts associated with this phase of instruction.

At this phase (i.e., the use of the rhythm exercise charts), or possibly earlier, the students are introduced to a color-coding system that associates certain colors with the musical notes of a scale. While other systems may be used, the E-Z KEYS™ system (E-Z Method Co., P.O. Box 6005, Bellingham, Wash. 98227) provides an eminently suitable system of color-coded notes that has the advantage of employing colors that are found in a basic box of crayons, such as CRAYOLA™ crayons (Binny & Smith, Inc., 1100 Church Lane, Easton, Pa., 18044); in the EZ-KEYS™ system, the standardized colors for the notes of the scale are as follows: A—Orange, B—Blue, C—Red, D—Brown, E—Yellow, F—Purple and G—Green. Furthermore, the E-Z KEYS™ color code can readily be taught to very young children, utilizing the system that is described in U.S. Pat. No. 6,057,501 (incorporated herein by reference), which develops the association between the colors and the notes and their letter names through the vehicles of physical objects having sensory characteristics familiar to children (e.g., the sour-ish taste of a crabapple) and cartoon characters (such as puppets) whose shapes and qualities relate to the shape and sensory characteristic of the physical object, and whose name begins with the letter of the relevant note (e.g., Crabby Crabapple). This system has proven exceptionally effective in teaching young children, but again it will be understood that this step may not be necessary in the case of older students, with whom it may be more appropriate to mark the letter names of the notes on the blocked sheets rather than using a color code; in still other cases, it may be most appropriate to work directly with a traditional score.

Figure 5:
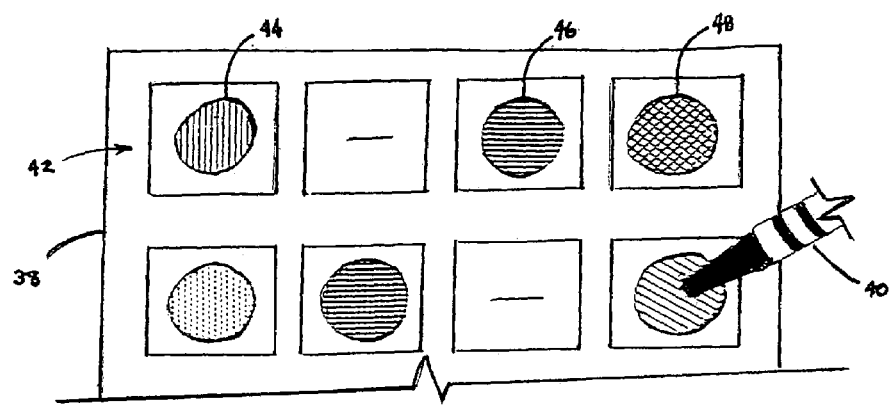
FIG. 5 is a plan view of a four/four rhythm worksheet, similar to that in FIG. 3B, showing the manner in which a pupil fills in the circles indicating notes with coded colors representing the notes of a musical scale.

Having established the color code, the students color in (using crayons, markers, or other suitable instruments) the open, blank areas of the circles (or other symbols) on the worksheets that indicate the notes of the rhythm; with more advanced students, the color names may be written in addition to or in place of the coloring, thus complimenting the development of writing and spelling skills. This is again modeled by the teacher, and to begin with the sequences of the circles and dashes are selected to correspond to the notes of simple, predetermined songs, e.g., "Peas Porridge Hot". Accordingly, FIG. 5 shows an example worksheet 38 on which the circles representing notes are colored in using conventional crayons 40. For example, in the first sequence 32 of four squares, representing a single bar in four/four time, the circles 44, 46, 48 are colored red, blue and orange and therefore represent the notes C, B, and A, respectively, utilizing the EZ-KEYS™ color code noted above.

Figure 6:
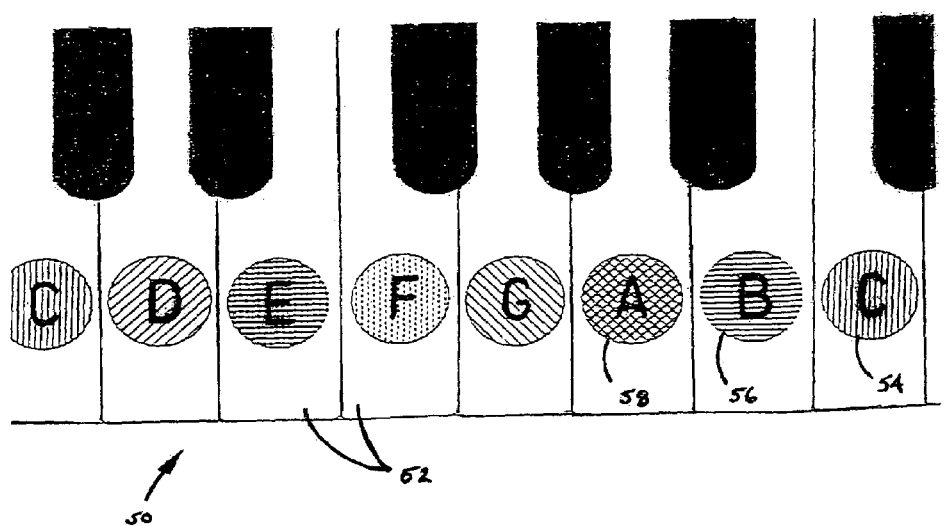
FIG. 6 is a plan view of a keyboard of a piano or other musical instrument, with color-coded markers mounted to the keys and bearing letters corresponding to the names of the individual notes of the scale.

After the circles representing notes have been colored in, the worksheet can be used as a "quasi-score" to play a keyboard or other instrument. For example, FIG. 6 shows a keyboard 50 having colored markers mounted (e.g., adhered) to the keys 52 in accordance with the predetermined color code; preferably, as is shown, the markers also bear the letter name for the notes and their respective keys. Referring to the worksheet that is shown in FIG. 5, the notes in the first sequence/bar are played by striking the keys having the markers 54, 56, 58 with matching colors. The markers are preferably mounted with keys in a manner such that they can be peeled off or otherwise removed when no longer needed by the student.

Initially, the students play the keyboard from the preprinted worksheets, or those which have been marked and colored from instruction sessions, and will therefore be playing simple songs and tunes that have been provided by the teacher. After a period of practice, however, when the students have gained confidence in playing the keyboard following the colored notes on the worksheet, the students can begin developing composition skills by marking and coloring the worksheets on their own. This can begin by having the students modify an existing sequence (e.g., a public-domain melody) and experiment with the changes in sound and harmony; for example, a the students may start with a simple tune such as "Peas Porridge Hot" and rearrange certain of the notes (e.g., place the notes on different lines and spaces) to see how this produces a different melody but with the same rhythm. Words can also be written on the worksheets above or below the boxes. Simple songs and tunes can be composed in this manner, which the students can then play on the keyboard in the same manner as described above. This introduces the child to musical composition and moreover helps to develop an understanding of pitch and tone. In a broader sense, this phase of the instruction aids in developing a child's overall abilities in composition and self-expression, which compliments instruction in other areas, e.g., instruction in language skills and written composition. Also, it will be understood that in some instances it may be advantageous to have the students engage in composition exercises at an earlier stage in the instruction, possibly as soon as notation on paper begins.

Figure 7A:
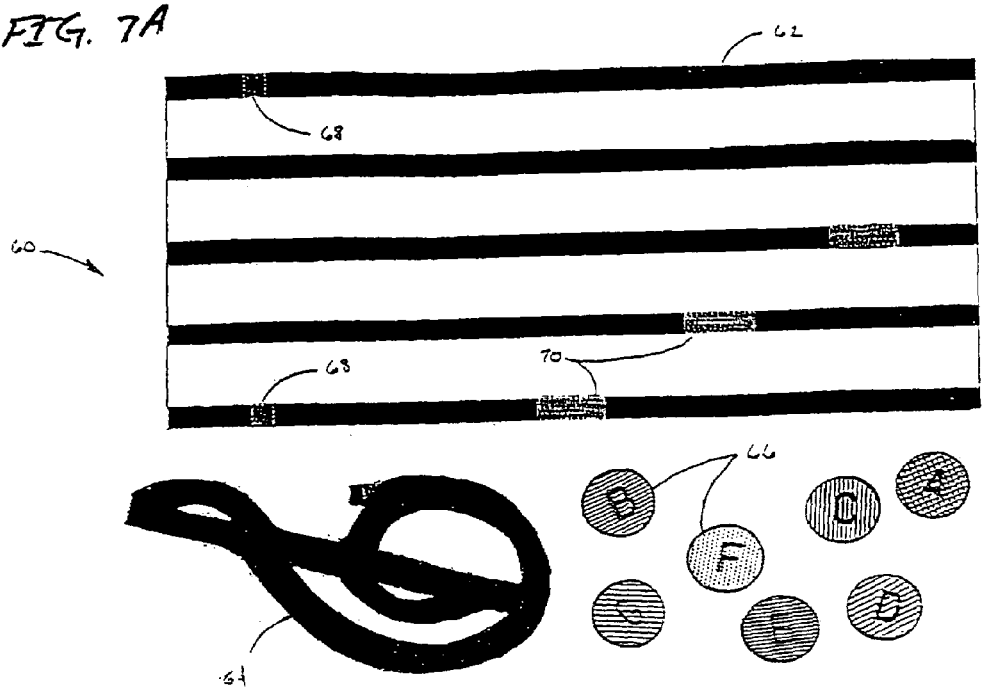
FIGS. 7A-7B are plan views of a printed stave together with clef and color-coded note markers, showing the manner in which the markers are detachably mountable to the stave so as to illustrate the relative positions of the notes thereon in preparation for transition to instruction using a conventional black-and-white score.
Figure 7B:
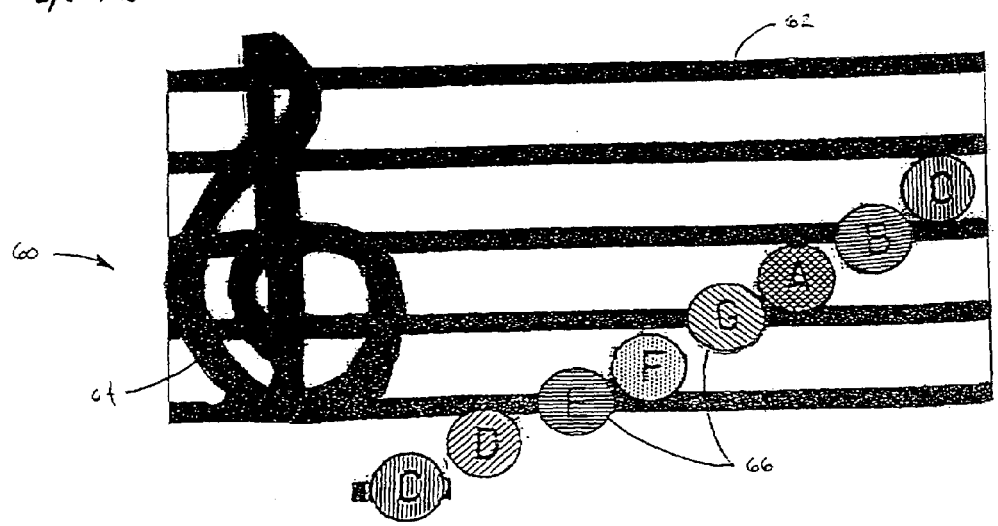

As can be seen in FIGS. 7A-7B, a removable note scale set 60 is provided for the next phase of instruction, i.e., transition to reading and use of musical scoring. As can be seen in FIG. 7A, the scale set 60 includes a large printed stave 62, a removable clef symbol 64 that is sized to match the stave 62, and a plurality of removable note markers 66. The note markers again employ the color-coding system described above, and correspond in shape, color, and letter markings to the note markers that are adhered to the keys of the keyboard as shown in FIG. 6. Although only a treble clef symbol is shown in FIGS. 7A-7B, it will be understood that a bass clef symbol will ordinarily be included as well.

As can be seen in FIG. 7A, the printed stave includes a first set of attachment points 68 proximate its left end for removable attachment of the clef symbol 64, and a plurality of attachment points 70 arranged in ascending order for removable attachment of the note markers. The attachment points may suitably be formed of hook-and-loop material (e.g., VELCRO™) adhered to the stave, with additional hook-and-loop material on the backs of the symbol and markers, although other forms of attachment materials, mechanisms or adhesives may be used which allow the markers and cleft symbols to be removably attached to the stave. It will also be understood that in some embodiments a computer graphic or other visual display may be used, although devices that can be physically manipulated (such as those shown in FIGS. 7A-7B) are in general more suited to and developmentally beneficial for young children.

It will be noted that the note markers are provided as separate, manipulable elements, as opposed to being presented to the students in fixed positions on the stave. This enables the students to make a more immediate association between the markers alone and the colored circles utilized in previous steps, without the complication of having to consider the stave and clef symbol at the same time. Moreover, the subsequent association between the note symbols and their positions on the scale is reinforced by allowing the children themselves to arrange the markers on the stave.

Accordingly, to use the scale set 60, the teacher first presents the note markers to the students to establish the relationship between the markers and the colored circles utilized in the preceding phases of instruction. The teacher then attaches the clef symbol and note markers at the proper locations on the printed stave (using the attachment points 68, 70), as shown in FIG. 7B. The teacher then removes the clef symbol and markers and allows the students to attach them to the stave in the manner that she has modeled. A scale set may also be provided that has attachment points for all of the note markers at each beat of the rhythm, in order to allow the markers to be arranged according to a tune or song that is to be played on the keyboard.

The students can at this (or an earlier) stage be provided with lined sheets on which to mark the clef symbols and notes for the meters. This can be done in conjunction with allowing the students to compose their own songs as noted above.

After familiarity between the notes and their positions on the stave has been established, the colored markers shown in FIGS. 7A-7B are replaced with black markers of a similar shape. The colored markers may be replaced with black markers all at once, however, a smoother transition may be accomplished by replacing the colored markers on a gradual basis, for example, first replacing first one of the colored markers (e.g., the "A" marker) with a black marker, practicing for a period with the remaining colored markers in place, replacing another of the colored markers with a black marker and practicing, and so on.

While the version of the invention that is illustrated in the figures teaches the "C" scale using only quarter notes, it will be understood that the system can be used to teach other scales, as well as flats and sharps. Basic chords and tone sequences can also be introduced.

The foregoing discussion has touched on certain aspects of the present invention that compliment other facets of the pupil's instruction. These and other areas where the musical instruction of the present invention compliments aspects of conventional curriculum will be described in greater detail below.

A particular area of correlation is with instruction in math and fractions, which may commence at preschool levels and continue through the upper elementary grades. At the earlier stages, the counting of lines, spaces, steps and chords compliments basic instruction and numerical relationships and sequences. Beyond this, the notes and rests represent fractions, from ½s, to ⅛s, ¹/₁₆s, and so on; the names of the notes and rests themselves, namely "whole", "half", "quarter", "eighth", "sixteenth" and so on indicate the values of fractions. Not only does the system of the present invention provide a basic understanding of fractions, but it in fact puts the concept of fractions to use in a variety of ways—listening, moving, composing, writing—that are not only fun but relate and apply the concept of fractions to a variety of activities, thus complimenting the student's regular instruction in mathematics and reinforcing their understanding of how mathematical concepts are utilized and applied in other contexts.

Figure 8:
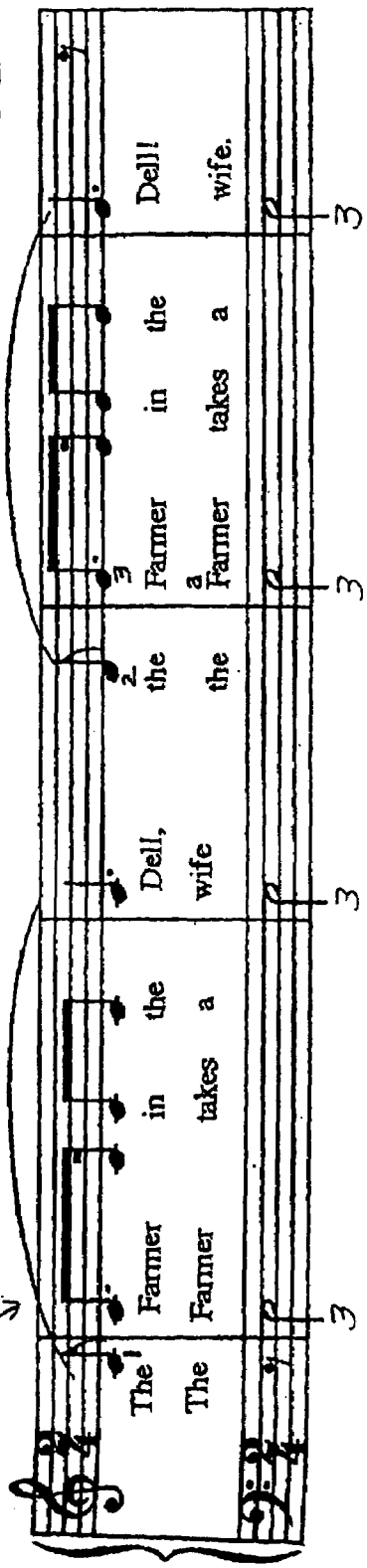
FIG. 8 is a plan view of a chart for mathematical instruction utilizing algebraic equations based on the block representation of rhythm in accordance with the present invention.

For example, FIG. 8 shows a chart in which mathematical equations are related to the notes and measures of a score, employing the vehicle of the blocked notation described above. In this example the score ("The Farmer in the Dell") is in 2/4 time; each measure is therefore represented by four blocks (representing quarter note times), arranged in additive sequence giving a total of two beats per measure. The score and equations can be provided to the pupil (e.g., on a paper worksheet of computer screen), with blanks in the blocks and totals spaces. Looking at the score, the student may then fill in the blocks with the value of each note, e.g., "1" for a quarter note, "½" for an eighth note, "¼" for a sixteenth note, and so on. The values are then added up to give the total value for each measure, e.g., "2" in the example that is illustrated. Alternatively, the pupil may begin with the total (e.g., "2") from the time signature, and work back from this to determine the values for each of the notes (in some cases, the values of one or more of the notes may be filled in ahead of time to aid the student in calculating the values of the others). In this manner, the student gains not only an understanding of the mathematic structure of music, and the relative time values of the notes that form the rhythm, but practice in general mathematics and solving algebraic equations as well.

A wide variety of algebraic and other mathematic exercises can be constructed on this general basis. The following tables illustrate exemplary exercises that can be conducted using common time signatures and well-known melodies. It will be noted that the exercises can be structured so as to progress from an initial association between the rhythm blocks and the note values to relatively sophisticated algebraic problems on the one hand, and to compositional practice and instruction on the other. Moreover, it can be seen that instruction in the clef and bass symbols and note markings can be integrated into the problems. It will also be understood that a great many other questions and problems can be constructed similar to the examples given in the tables, as well as questions/problems for any given time signature or score.

In the following examples, the child is given the score for a familiar tune, as indicated by the titles in italics. The student then answers the questions and/or solves the algebraic equations or other math problems by referring to the printed score (not shown in the tables). Again, it will be understood that any suitable musical score may be used, including compositions created by the students themselves.

TABLE A

Score: Where Oh Where Has My little Dog Gone?
Music Math:
3/8 Time Signature means there are 3 beats (counts), to a Measure, and an eighth note receives 1 beat--count. A quarter note gets 2 beats.

| 1 | + | 1 | + | 1 | = | 3 |

Draw the appropriate notes whose values when added would total 3.

| 2 | + | 1 | = | 3 |

Draw the appropriate notes whose values when added would total 3.

TABLE B

Score: Tea
Music Math:
Write the music math algebraic equation for four quarter notes in 4/4 Time and show what the sum equals.
Write the music math algebraic equation for two quarter notes plus one half note in 4/4 Time. Show what the sum equals.
Score: Peas Porridge Hot
Music Math:
Algebraic Equations for 4/4 Time Signature. Draw the correlating notes under each box.

| 1 | + | ½ | + | ½ | + | 2 | = 4 |

| 1 | + | ½ | + | ½ | + | ½ | + | ½ | = 4 |

Write an equation with three boxes that equal 4.
Write some math equations using ½ and numerals that equal 2, 3, 5 (not

TABLE B-continued associated with 4/4 Time).
Score: Mary Had A Little Lamb
Music Math:
Copy the number of boxes with their numbers, and place 4/4 Time notes of corresponding value in each box. The note values should add up to 4 beats to a measure.

[1] + [1] + [1] + [1] = 4

[1] + [1] + [2] = 4

[4] = 4

Score: Jack and Jill
Music Math:
Algebraic Equation for 4/4 Time--Write the 4/4 Time notes with values that would equal 4 for each of these measures.

[ ] + [ ] + [ ] + [ ] = ___

[ ] + [ ] + [ ] = ___

[ ] + [ ] = ___

[ ] = ___

Remember that in 4/4 Time:
    Quarter notes get 1 count (beat)
    Half notes get 2 counts (beats)
    Whole note gets 4 counts (beats)
Score: Muffin Man
Music Math:
There are 5 measures in the song that have the same note values. They have a quarter note, quarter note, dotted quarter note and an eighth note. Write the number of each note value in the boxes. They should equal 4.

TABLE B-continued

[ ] [ ] [ ] [ ]

Write the notes under the boxes that correspond to the numbers in the box.
Score: Twinkle, Twinkle Little Star
Music Math:
This time pattern repeats every two measures throughout the song:
4 quarter notes in the first measure, then 2 quarter notes and a half note in the second measure. Write the note and its value in each box. Both measures equal 4, for 4/4 Time.

First Measure      and      Second Measure

[ ][ ][ ][ ] | [ ][ ][ ]

Score: Yankee Doodle
Music Math:
Write a song using a music math equation. Have three measures of just quarter notes, and one measure with 2 half notes. Repeat the patter 4 times.

Measure 1      Measure 2

[ ][ ][ ][ ]‖ [ ][ ][ ][ ]‖

Measure 3      Measure 3

[ ][ ][ ][ ] | [ ][ ]

Write the letter name of a note in each box. Then play your song on a keyboard. Change notes that you feel do not sound like you want the melody to sound. Use the time pattern of Yankee Doodle to help you.

TABLE C

Score: Mulberry Bush
Music Math: (Algebra Equations)
In 6/8 Time, draw the note that gets 1 beat. What is its name?
Draw the note that gets 2 beats. What is its name?
Draw the note that gets 3 beats. What is its name?
Draw notes of the correct value above each box. Be sure they total to 6 as in a measure for 6/8 Time.

[1] + [1] + [1] + [2] + [1] = 6    Equals 6 beats to a measure.

[1] + [1] = 6

Score: Hickory Dickory Dock
Music Math:
Write algebraic equations for three measures that have notes of different values that equal six.
Remember an eighth note gets 1 beat, a quarter note gets 2 beats, and a dotted quarter note receives 3 beats.
How many counts (beats) does each of the dotted quarter notes in the Bass get?
Score: Sweetly Sings the Donkey
Music Math:
The following is a Measure of 6/8 Time often repeated in this song. The note values are:
a quarter note, an eighth note, a quarter note, and an eighth note, which equal 6 beats to the measure. The algebraic equation would be:

TABLE C-continued

| 2 | + | 1 | + | 2 | + | 1 | = | 6 | Beats to a Measure |

Draw the correct notes above each box to show their value in 6/8 Time.
Another Measure repeated in the song is: a dotted quarter note, tied to a quarter note, and an eighth note. The algebraic equation is shown below. Draw below the boxes, the 6/8 Time notes that correspond to the number values in the boxes.

| 3 | + | 2 | + | 1 | = | 6 | Beats to a Measure |

Score: Row Row Row Your Boat
Music Math:
These equations indicate the value of the notes in some measures. Find their sums. Then convert the number into a note of that value and make an equation that equals the correct sum.
Add--
3 + 3 =
2 + 1 + 3 =
2 + 1 + 2 + 1 =
1 + 1 + 1 + 1 + 1 + 1 =
6 + 0 =
Score: Pop Goes The Weasel
Music Math:
Draw a circle. Draw the monkey chasing the weasel around the cobbler's bench.
Draw a circle. Divide it into 3 equal parts. Draw a quarter note in each part.
Draw a circle. Divide it into 6 equal parts. Draw an eighth note in each.
Write an algebraic equation for a dotted quarter note plus a dotted quarter note and their sum for 6/8 Time.

| ☐ | ☐ | = | ☐ |

Write an algebraic equation for a dotted half note in 6/8 Time.

| ☐ | = | 6 |

Score: Little Jack Horner
Music Math:
Fill in the missing number (the note value) that is missing for 6/8 Time:

| 1 | + | ☐ | + | ☐ | + | ☐ | + | ☐ | = | 6 | Fill in the missing numbers. Write, in or above the box, the note that has the value of the number in the box. |

| ☐ | ☐ | ☐ | = | 6 | Fill in the missing number. They should be the value of notes that equal 6. Put in , or above the box, the note that has the value of the number you write in the box. |

Score: Little Boy Blue
Music Math:
Little Boy Blue, Little Jack Horner, and Little Miss Muffet are songs that are written in 6/8 Time. If you compare the music scores for each, you will see the similarity.
They all have 3 eighth notes, a quarter note and an eighth note for many measures in their melody.

| ☐ | + | ☐ | + | ☐ | + | ☐ | + | ☐ | = | 6 |

Write the note values in the boxes. They should add up to 6.
Then write your own arrangement of notes; value and note letter names. Repeat the time value of the notes in other measures so as to make your own original phrase, or musical sentence. Play your measures on a keyboard. Change notes that you feel do not harmonize, or sound wrong to your ear.
Score: Little Miss Muffet
Music Math:
Write a song in 6/8 Time. Have it with 6 measures. Each measure should be with 6, eighth notes, all the same. Such as 6, "C", eighth notes. Write the letter names in the

TABLE C-continued boxes. Write some words to your original song. You may then enjoy making your own lined score paper with a Treble Clef sign, Key Signature, 6/8 Time Signature, and then write the correlating notes on the appropriate lines and spaces for your letters in the boxes. (It may be hard but then try notes for the Bass that harmonize.)

Measure 1  ☐ ☐ ☐ ☐ ☐ ☐

Measure 2  ☐ ☐ ☐ ☐ ☐ ☐

Measure 3  ☐ ☐ ☐ ☐ ☐ ☐

Measure 4  ☐ ☐ ☐ ☐ ☐ ☐

Measure 5  ☐ ☐ ☐ ☐ ☐ ☐

Measure 6  ☐ ☐ ☐ ☐ ☐ ☐

TABLE D

Score: Baa Baa Black Sheep
Music Math:
How many quarter notes do you count in the Treble Clef?
How many eighth notes do you count in the Treble Clef?
How many half notes are in the Treble Clef?
How many counts do the half notes in the Bass Clef get?
How many measures are there in the song?
What measure has a chord in it? What are the names of the notes in the chord?
Each measure receives 2 counts. Count the measures and times the number by 2. The answer will tell you how many counts there are in one verse of the song. The algebraic equation would be:

☐ + ☐ = ___

Write an algebraic equation for two different measures of the song with different note values.
Score: Farmer in the Dell
Music Math:
How much does the first note of the song and the notes in the last measure add up to?

$\boxed{½} + \boxed{¼} + \boxed{¼} + \boxed{½} + \boxed{½} = 2$ $\boxed{\phantom{x}} + \boxed{\phantom{x}} + \boxed{\phantom{x}} = 2$ Write to 2/4 Time notes of the correct value in, or above the boxes in the algebraic math equation.
Score: This Old Man
Music Math:
This song has 2/4 Time so a half note gets 2 beats, a quarter note gets 1 beat, and eighth note gets ½ beat, a dotted eighth note gets 1 and ¼ beats, while a sixteenth note receives ¼ beat or count.
The following algebraic equations are to represent some Measures in the song, and correspond to the note values for 2/4 Time. Write equations by drawing the notes of the corresponding values that equal 2 Beats for each measure in the spaces provided.

$\boxed{½} + \boxed{½} + \boxed{1} = \boxed{2}$ Beats ___ + ___ + ___ = ___

$\boxed{½} + \boxed{½} + \boxed{½} + \boxed{½} = \boxed{2}$ Beats to a Measure

___ + ___ + ___ + ___ = ___ Beats to a Measure $\boxed{¼} + \boxed{¼} + \boxed{¼} + \boxed{¼} = \boxed{1}$ 2 Beats to a Measure ___ + ___ + ___ + ___ + ___ = 2 Beats to a Measure

TABLE D-continued

Score: London Bridge
Music Math:
How many measures have a dotted eighth note, a sixteenth note and two half notes?
How much does that add up to? (½ + ¼ + ¼ + ½ + ½ = 2)
How many measures have two notes with ½ count (2 eighth notes), and one note that counts one (quarter note)? Draw the notes.
How many counts do the half notes in the Bass get?
How many counts does a dotted quarter note get? Draw a dotted quarter note.
Experiment and see if you can use 2 quarter notes in the Bass that harmonize with the melody.
Draw an algebraic equation with a number and correct note in each box. Show the sum.

Score: Jingle Bells
Music Math:
Using the broken chord rhythm of the Bass that is in this 2/4 Time song, write the Treble note melody. Use only the first 5 notes of the Key of "G" scale. That would be G, A, B, C, and D. You may place the letters in the Music Algebraic boxes first. The 4 top boxes will be your Treble melody. Since it is 2/4 Time, each box in the Treble will represent the value of an Eighth note (½ beat). The Bass will have 2 boxes each. Since it is 2/4 Time, those boxes will have the value of a quarter note (1 beat).

(You may want to write your composition on score paper)

Treble:
☐☐☐☐ | ☐☐☐☐ | ☐☐☐☐

Bass:
☐ ☐ | ☐ ☐ | ☐ ☐

☐☐☐☐ | ☐☐☐☐ | ☐☐☐☐

☐ ☐ | ☐ ☐ | ☐ ☐

Play your melody on a keyboard. Change notes if you don't like the melody. Write some words.

TABLE E

Score: My Hat
Music Math:
Write out the multiplication tables for three.
Can you think of other instances where 3 is important (like 3 strikes you out in baseball)?
What part of an hour is 3 on a clock? What do we call that portion of an hour? Draw the note in 3/4 Time of the same value and name as that portion of an hour.
How many equal portions of a pie would you have if you cut it into the name of that note?
Using rests and notes, write several music algebraic equation with each measure equaling 3 counts.

☐ ☐ ☐ = 3

Make a list of the different rests and their values. Practice drawing them by making your own score of 5 lines. Practice making Treble and Bass Staff signs. Draw an artistic design using 3 musical symbols.

Score: Home on the Range
Music Math:
"Home on the Range" has repeating phrases. Write an algebraic equation of the first phrase of the song. Each measure has 3 beats. In the equation boxes, write the value of the note and the note and the letter name of the note.
Ten duplicate the boxes with the same time pattern, but put in a different letter name for the note. This will change the melody of the song. When you play it on a keyboard, change any note that you feel does not have the tone you want in your original melody.

TABLE E-continued

Score: Best Things
Music Math:
Write a song in 3/4 Time, in the Key of "F". Fill the boxes with only F, G, A, B Flat, and C letters that represent the notes of the "F" Scale, and the keys on a keyboard. Then play your song on a keyboard.
Change notes if they don't harmonize, to something that pleases you.

☐☐ | ☐☐ | ☐☐

☐☐ | ☐☐ | ☐☐

Score: America
Music Math:
Fill in the missing number (the note value) that is missing for 6/8 Time:

☐☐  ☐☐  ☐☐

☐☐  ☐☐  ☐☐

You may change this pattern if your melody wants more eighth notes. The boxes do not indicate the time value of the notes. They give an indication of the count for each measure. In this case, there are 3 counts to a measure, but there could be more or fewer notes than the 3 boxes in these box measures.

TABLE E-continued

For example, toward the end of the song "America", there are 4 notes in one measure; 2 eighth notes and 2 quarter notes. Another measure has 1 quarter note and 4 eighth notes, making the measure have 5 notes. And the last measure of the song has a dotted half note, so the measure has only one note.

Some students will appreciate the help of the boxes, others who understand note values better can either place several eighth notes in one box, or add more boxes to the measure concept. There are some students who may just want to use a traditional music score, if their understanding is more advanced.

Additional concepts may be incorporated as the instruction progresses to more advanced levels, while still retaining integration with other curricula. For example, the work problems set forth in the following tables show the introduction of specific types of rhythms and the development of musical composition skills, while continuing to integrate instruction in algebraic equations. In the following Tables F, G, H and I, fractions are used in place of the conventional symbols for musical notes, which are not generally available in electronic format.

TABLE F

Waltz
Basic Rhythm: 3/4 Time  >   >   >
                Count:  1 2 3   1 2 3   1 2 3
The Waltz is 3/4 Time, so there are three counts to a measure. The first count is accented and counts second and third are not accented.

TABLE F-continued

The Waltz is perhaps the most famous of all dances. It became prominent in Germany and Austria in 1780. Waltzes were at first played slowly, but the Viennese composers such as Mozart, Beethoven, Chopin, and Brahms sped up the tempo. However, Johann Strauss is the most famous composer, with the "Blue Danube".

The Waltz characteristically has one chord (or broken chord) per measure, and that chord often lasts for many measures. The root note is often the first note of the measure followed by the fifth of the chord. The music is smooth and melodic, giving grace to the dance.

Treble     =     Bass
[ ][ ]  =  [ ][ ][ ]

[ ][ ][X]  =  [ ][X]
What does X equal?

[ ][ ][ ][ ]  =  [ ][ ]

[ ][ ][ ][X]  =  [ ][ ]
What does X equal?

Find a song that is a Waltz. What Time signature will it have? On a music score sheet, in the treble clef place notes on the lines and spaces of your choice. Make it melodic and cheerful! Find the key you are in, and the root chords--they will harmonize with your song. Make pattern of 2 or 3 measures. Repeat them.

TABLE G

March
Basic Rhythm: 4/4 Time or ₵ Time
              >   >    >   >    >   >
  4/4 count:  1 2 3 4 | 1 2 3 4 | 1 2 3 4

The March originated as a way to have troops walk in formation--it helped with morale and lessened fatigue. Often drums alone maintained the beat, but other percussion instruments, brass and woodwinds are now used. The harmony is usually simple, and utilizes the basic chords of the key. The primary accent is on the first count of the measure, and the secondary accent on the third count in 4/4 Time.

In cut-time (₵) the march is counted two to the measure. The primary accent is on the first count, and the secondary accent on the second count. Usually there are chords on the afterbeats that are not accented.

₵       >    >    |  >    >    |  >    >
   count:  1 &  2 &  |  1 &  2 &  |  1 &  2 &

Treble              =         Bass
[ ][ ][ ][ ]        =    [ ][ ][ ][ ]
1/4 1/4 1/4 1/4     =    1/4 1/4 1/4 1/4 or

[ ][ ][ ][ ]  =  [ ][ ][ ][ ]

or

[ ][ ][ ][ ][ ]  =  [ ][ ][ ][ ]

or

[ ][ ][ ][ ]  =  [ ][ ][ ][ ]

or

[ ][ ]  =  [ ][ ][ ][ ][ ][ ][ ]

[ ][ ][ ][ ]  =  [ ][ ][ ]     Fill in the missing notes.

Write other treble and bass music equation sets. Then arrange a melody on a music score sheet. Decide and harmonize the bass. Have a steady marching beat.

TABLE H

Conga
Basic Rhythm: C  >        >  >    >  >U
The Conga is recognized by the anticipation and accent of the second beat in the second measure of the basic rhythm pattern. There is a strongly accented beat on the fourth eighth note of the measure rather than on the fifth eighth. For example:
Count: 123 4‿56 78
This accent is of equal importance as the initial first beat of the pattern, instead of a weaker accent. The notes between these two accents are less prominent in their accents. Of Cuban origin, the Conga is a syncopated dance related to the Rhumba. The dance is often performed as a long "Conga Line" which snakes around the floor as participants follow a leader.

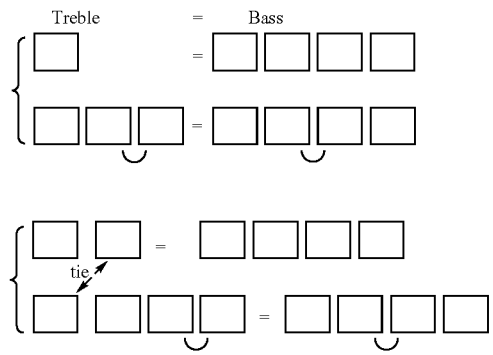

Write the values of the notes used in the treble and bass rhythm patterns to
get the desired Conga beat. Note the tied notes and rests. The rhythm pattern is two measures that repeat the time pattern throughout the song for the syncopation.
Write a bass pattern in the key of "C". Then find a melody in the treble. It must follow the time pattern also. Can you compose a rap song to this beat?

TABLE I

Fox Trot
Basic Rhythm: C
                          >   >   >   >
Count for cut-time:  1   2 |  1   2
The Fox Trot is usually written in cut. It is counted two beats to a measure. The main beat occurs on the first count and the second count is given a lesser accent. Accompaniment chords are on the afterbeats. The Fox Trot has been popular since 1915. It is the basic framework for many ballroom dances, including Latin-American dances such as the Beguine and the Cha-Cha. Some swing and rock and roll have also used the Fox Trot as their base.

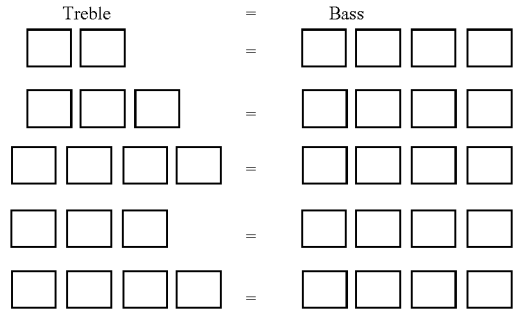

On a music score sheet, place quarter notes (in the treble clef) on the lines and spaces of your choice. There will be 4 quarter notes in the treble clef for each measure. The bass should have a quarter note, a quarter rest, a quarter note, a quarter rest. The treble melody should be smooth, not too high and then jump to row, but between 5 or 6 steps on the score. Add words. Play the score on a keyboard and sing!

The method of the present invention also aids in language development and literacy. Singing the songs as described above can help develop skills in language, reading and vocabulary, as well as auditory awareness. Moreover, the step of composing music, which can include writing original lyrics, serves to develop language and literacy skills on a comparatively advanced level and can be correlated with instruction in written composition. Still further, as was noted above, the words utilized in the songs can correlate to specific subjects of the other courses of instruction, e.g., geography, history, social studies, and so on. The songs may also be incorporated into plays or other drama events.

Furthermore, in addition to academic benefits, the movements involved in the various phases of the system help to develop physical coordination utilizing both small and large muscle groups. For example, as noted above, the activities associated with the exercise charts can include rhythmic skipping, galloping, hopping, turning and dancing, all of which exercise large muscle groups. Small muscle development and fine motor coordination are required for use of a musical keyboard and, in the later phases, is complimentary to development of keyboard skills for use with computers and the like, for example.

It is to be recognized that various alterations, modifications, and/or additions may be introduced into the constructions and arrangements of parts described above without departing from the spirit or ambit of the present invention.

What is claimed is:

1. A method for instructing musical notation, said method comprising the steps of:
   demonstrating a musical rhythm having a plurality of beats;
   associating said rhythm with a worksheet having a plurality of blanks thereon, each blank representing a beat of said rhythm and said blanks being grouped in accordance with said rhythm;
   filling said blanks on said worksheet with first and second symbols, said first symbol representing a beat which is sounded in said rhythm and said second symbol representing a beat which is a pause in said rhythm; and
   associating each of said symbols on said worksheet representing a beat which is sounded with a color that represents an individual note of a musical scale in accordance with a predetermined code.

2. The method of claim 1, wherein the step of demonstrating said rhythm comprises:
   indicating a plurality of objects in sequence with said rhythm.

3. A method of claim 2, further comprising the step of:
   arranging substantially interchangeable objects in rows in accordance with a meter of said rhythm.

4. A method of claim 3, wherein the step of indicating a plurality of objects comprises:
   tapping said plurality of objects that are grouped in accordance with said meter of said rhythm.

5. A method of claim 4, wherein said interchangeable objects comprise:
   a plurality of blocks for being tapped with a mallet.

6. The method of claim 5, wherein said blanks on said worksheet comprise:
   blank squares that correspond in shape to said blocks that are tapped.

7. The method of claim 1, wherein the step of filling said blanks on said worksheet comprises:
   forming said first symbol that indicates a sounded beat with a blank open area that can be colored in by pupils.

8. The method of claim 7, wherein said first symbol is a circle and said second symbol is a dash.

9. The method of claim 1, further comprising the step of: practicing said rhythm that has been demonstrated.

10. The method of claim 9, wherein the step of practicing said rhythm comprises:
presenting at least one practice chart having said first and second symbols printed thereon.

11. The method of claim 1, further comprising the steps of:
providing colored markers on keys of a keyboard in accordance with said predetermined code; and
playing said keyboard from said worksheets having said colored-in symbols thereon.

12. The method of claim 11, further comprising the steps of:
marking and coloring in at least one of said worksheets so as to create a musical composition thereon; and
playing said keyboard from said composition created on said worksheet.

13. The method of claim 11, further comprising the step of:
presenting at least one musical stave having colored markers arranged so as to indicate positions on said stave of notes that are represented by the colors of said markers in accordance with said predetermined code.

14. The method of claim 13, further comprising the step of:
detachably mounting said colored markers to said musical stave so as to permit said markers to be rearranged thereon.

15. The method of claim 1, further comprising the step of:
relating a mathematical problem to at least one sequence of said blanks on said worksheet, so as to integrate mathematical instruction into said method for instructing musical notation.

16. The method of claim 15, wherein the step of relating a mathematical problem to at least one sequence of blanks comprises:
providing musical note time values for selected blanks of said at least one sequence and leaving time values for other blanks open to be determined in completing said mathematical problem.

17. The method of claim 15, wherein the step of relating a mathematical problem to at least one sequence of blanks comprises:
relating a plurality of fractional values to said at least one sequence.

18. The method of claim 15, wherein the step of relating a mathematical problem to at least one sequence of blanks comprises:
relating an algebraic equation to said at least one sequence.

19. The method of claim 1, further comprising the step of:
associating a plurality of words with said blanks on said worksheet so as to form a song to be sung when said blanks are filled with symbols representing musical notes, said words being selected from subject matter in at least one other area of instruction, so as to integrate said other area of instruction into said method for instructing musical notation.

20. A method for instructing musical notation, said method comprising the steps of:
demonstrating a musical rhythm having a plurality of beats;
associating said rhythm with a worksheet having a plurality of blanks thereon, each blank representing a beat of said rhythm and said blanks being grouped in accordance with said rhythm;
filling said blanks on said worksheet with first and second symbols, said first symbol representing a beat which is sounded in said rhythm and said second symbol representing a beat which is a pause in said rhythm; and
relating a mathematical problem to at least one sequence of said blanks on said worksheet so as to integrate mathematical instruction into said method for instructing musical notation, the step of relating a mathematical problem to at least one sequence of blanks comprising relating an algebraic equation to said at least one sequence.

21. A method for instructing musical notation, said method comprising the steps of:
demonstrating a musical rhythm having a plurality of beats;
associating said rhythm with a worksheet having a plurality of blanks thereon, each blank representing a beat of said rhythm and said blanks being grouped in accordance with said rhythm;
filling said blanks on said worksheet with first and second symbols, said first symbol representing a beat which is sounded in said rhythm and said second symbol representing a beat which is a pause in said rhythm; and
associating a plurality of words with said blanks on said worksheet so as to form a song to be sung when said blanks are filled with symbols representing musical notes, said words being selected from subject matter in at least one other area of instruction so as to integrate said other area of instruction into said method for instructing musical notation.

* * * * *